US011865557B2

(12) United States Patent
Poirier

(10) Patent No.: US 11,865,557 B2
(45) Date of Patent: Jan. 9, 2024

(54) FLEXIBLE SHOWER HEAD

(71) Applicant: Benoit Poirier, Revelstoke (CA)

(72) Inventor: Benoit Poirier, Revelstoke (CA)

( * ) Notice: Subject to any disclaimer, the term of this patent is extended or adjusted under 35 U.S.C. 154(b) by 528 days.

(21) Appl. No.: 16/505,584

(22) Filed: Jul. 8, 2019

(65) Prior Publication Data

US 2021/0008573 A1 Jan. 14, 2021

(51) Int. Cl.
*B05B 1/18* (2006.01)

(52) U.S. Cl.
CPC .................................... *B05B 1/18* (2013.01)

(58) Field of Classification Search
CPC ........... B05B 1/18; B05B 1/185; B05B 1/207; E03C 1/408; E03C 1/409; E03C 2001/0414
See application file for complete search history.

(56) References Cited

U.S. PATENT DOCUMENTS 2,759,765 A 8/1956 Pawley
4,901,927 A 2/1990 Valdivia
5,070,552 A 12/1991 Gentry et al.
5,735,307 A * 4/1998 Charron ................ F16K 5/0642 137/270
5,865,378 A 2/1999 Hollinshead et al.
6,302,152 B1 * 10/2001 Mulligan ................ F16L 11/10 138/109
6,370,713 B2 4/2002 Bosio
2006/0236451 A1 10/2006 Freedmann
2008/0035766 A1 * 2/2008 Belz ....................... A01G 25/02 239/726
2011/0284663 A1 * 11/2011 Natterer .................... B05B 1/26 239/513
2013/0119154 A1 * 5/2013 Sawyer ................... B05B 1/202 239/289
2014/0014735 A1 * 1/2014 Ford ....................... B05B 1/185 239/74
2017/0320074 A1 * 11/2017 Becktell ................ B05B 1/3026

* cited by examiner

*Primary Examiner* — Tuongminh N Pham

(57) ABSTRACT

An illustrated view of an exemplary shower head is presented. The shower head is useful for spraying a shower water in different directions during the same shower without having to readjust the entire shower head. The shower head is further useful for directing the water flowing from the shower head in different directions as desired without further intervention. The shower head has two pipes, each flexible coupled to a valve and the pipes have nozzles. The shower head has a main pipe coupled to a main valve and is coupled to a splitter connector pipe. The connector pipe is coupled to each of the pipes via the valve.

1 Claim, 1 Drawing Sheet

FLEXIBLE SHOWER HEAD

FIELD OF THE INVENTION

This invention relates to shower heads. More particularly, it relates to adjustable shower heads.

BACKGROUND

A shower is a place in which a person bathes under a spray of typically warm or hot water. Indoors, there is a drain in the floor. Most showers have temperature, spray pressure and adjustable showerhead nozzle. The simplest showers have a swiveling nozzle aiming down on the user, while more complex showers have a showerhead connected to a hose that has a mounting bracket. This allows the showerer to hold the showerhead by hand to spray the water at different parts of their body.

A shower can be installed in a small shower stall or bathtub with a plastic shower curtain or door. Showering is common in Western culture due to the efficiency of using it compared with a bathtub. Its use in hygiene is, therefore, common practice. A shower uses less water on average than a bath: 80 litres (18 imp gal; 21 US gal) for a shower compared with 150 litres (33 imp gal; 40 US gal) for a bath.

A stall shower is a dedicated shower area which uses a door or curtain to contain water spray. The shower over a bathtub saves bathroom space and enables the area to be used for either a bath or a shower and commonly uses a sliding shower curtain to contain the water spray. Showers may also be in a wet room, in which there is no contained shower area, or in a dedicated shower room, which does not require containment of water spray. Most domestic showers have a single overhead shower head, which may be adjustable.

Shower heads come in a few types: A) Fixed shower heads—Traditional fixed shower-heads are mostly common shower-faucets because as they can easily connect to the plumbing fixtures with-out any additional hardware; B) Shower handsets—Hand-set shower-faucets are connected by a flexible hose, and can also mounted and used like a fixed shower-head; C) Ceiling-mounted faucets—Ceiling-mounted shower-faucets are typically rain-drop shower-heads mounted in one shower ceiling. Water-rains down, at low or medium pressure, using the gravity to shower on one from directly above; D) Adjustable shower heads—Adjustable shower faucets often have numerous settings, including the pulsating massage settings and high-pressure; and E) Shower panels—Unlike a single showerhead, these are wall-mounted with sprayers aimed horizontally at various parts of the body.

Often when showering the shower head needs to be adjusted to reach certain areas, the current shower heads adjust in pressure and types of spray, but they do not allow the movement and reshaping of the shower head to a desired positioning by the showerer. In light of the foregoing, there is a need for a shower head to adjust and reshape to accommodate the needs of the showerer.

DETAILED DESCRIPTION

Figure 1B:
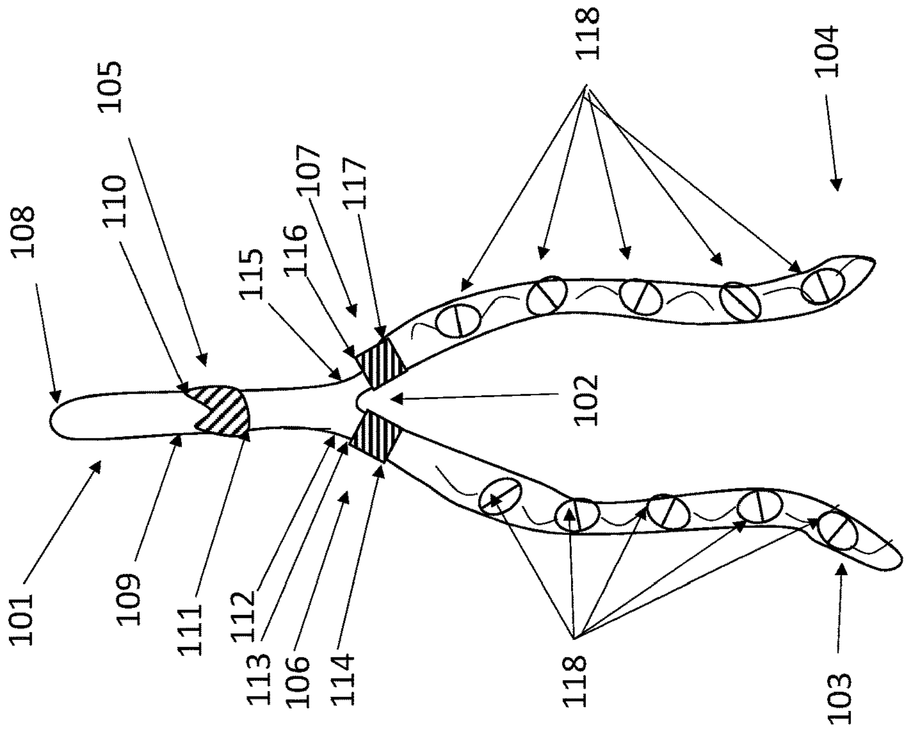
FIG. 1B is an illustrated second view of the exemplary shower head shown in FIG. 1A.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1A:
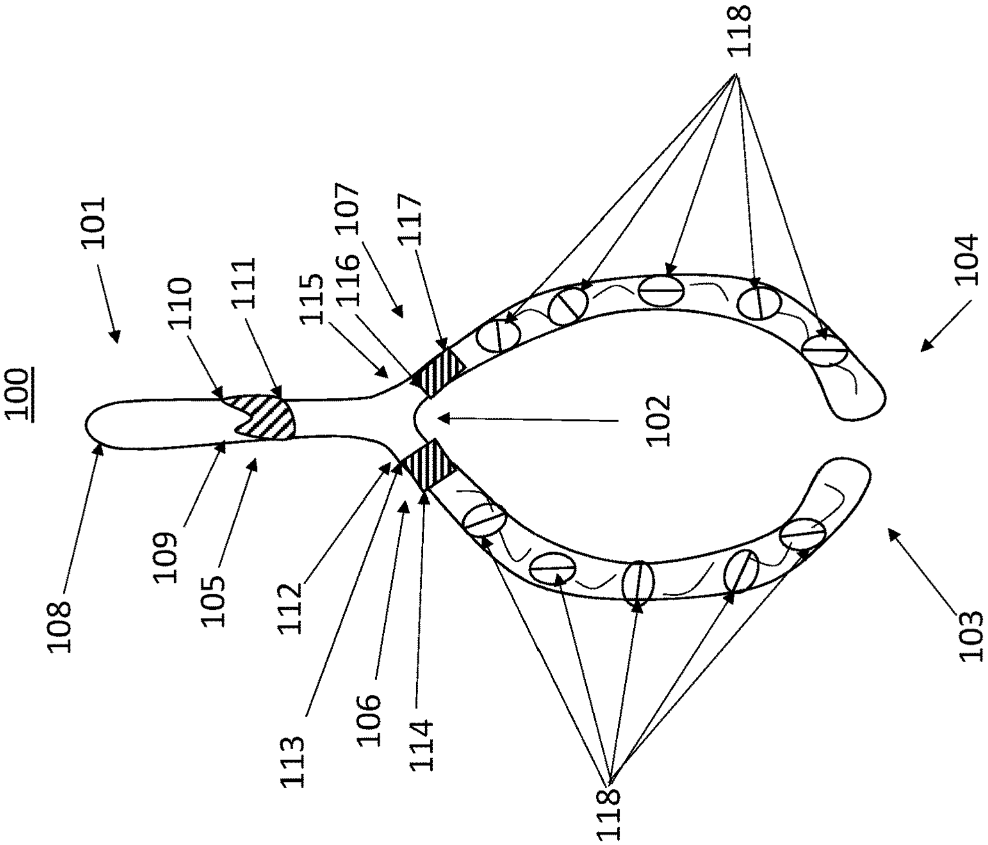
FIG. 1A is an illustrated first view of an exemplary shower head.

Referring to FIG. 1A and FIG. 1B, an illustrated view of an exemplary shower head 100 is presented. The shower head 100 is useful for spraying a shower water in different directions during the same shower without having to readjust the entire shower head. The shower head 100 is further useful for directing the water flowing from the shower head in different directions as desired without further intervention.

The shower head 100 has a main pipe 101, a connector pipe 102, a first pipe 105, a second pipe 104, a main valve 105, a first arm valve 106 and a second arm valve 107.

The main pipe 101 has a first end 108 and a second end 109. The first end 108 of the main pipe 101 is coupled to a water pipe (not shown) configured to be coupled to a water source (not shown). The second end 109 of the main pipe is mechanically coupled to a first end 110 of the main valve 105. The main pipe 101 is preferably galvanized steel material, but other materials are hereby contemplated, including, but not limited to, aluminum, poly-vinyl chloride (PVC), plastic, copper, etc. The main valve 105 is preferably a swivel valve. The main valve 105 is preferably able to be swiveled from zero degrees to ninety degrees (0°-90°).

The connector pipe 102 is coupled to a second end 111 of the main valve 105. The connector pipe 102 is preferably a u-shape, but other shapes are also contemplated. The connector pipe 102 is preferably a split pipe such that one single pipe is communicatively coupled to two additional pipes. The connector pipe is preferably galvanized steel material, but other materials are hereby contemplated, including, but not limited to, aluminum, poly-vinyl chloride (PVC), plastic, copper, etc.

A second end 112 of the connector pipe 102 is coupled to a first end 113 of the first arm valve 106. A second end 114 of the first arm valve 106 is coupled to the first pipe 105. The first pipe 105 is preferably flexible. The first pipe 105 is preferably made of a rubber material, but other materials are hereby contemplated including, but not limited to, plastic, nylon, etc. The first pipe 105 preferably has a stainless-steel coating. The first arm valve 106 is preferably a swivel valve. The first arm valve 106 is preferably able to be swiveled from zero degrees to ninety degrees (0°-90°). The first pipe 105 is preferably a length of eighteen (18) inches, but other lengths are hereby contemplated, including, but not limited to, sixteen (16) inches, twenty (20) inches, etc.

A third end 115 of the connector pipe 102 is coupled to a first end 116 of the second arm valve 107. A second end 117 of the second arm valve 107 is coupled to the second pipe 106. The second pipe 106 is preferably flexible. The second pipe 106 is preferably made of a rubber material, but other materials are hereby contemplated including, but not limited to, plastic, nylon, etc. The second pipe 106 preferably has a stainless-steel coating. The second arm valve 107 is preferably a swivel valve. The second arm valve 106 is preferably able to be swiveled from zero degrees to ninety degrees (0°-90°). The second pipe 106 is preferably a length of eighteen (18) inches, but other lengths are hereby contemplated, including, but not limited to, sixteen (16) inches, twenty (20) inches, etc.

The shower head 100 has a plurality of nozzles 118. The number of the plurality of nozzles 118 is preferably ten (10), but other number of nozzles are hereby contemplated, including, but not limited to, eight (8), twelve (12), fifteen (15), etc. The plurality of nozzles 118 are coupled to the first pipe 105 and the second pipe 106. Each of the plurality of nozzles 118 are adjustable.

The shower head 100 shown in FIG. 1A shows a semi-circular shape. The shower head 100 shown in FIG. 1B is substantially u-shape after the shower head 100 shown in FIG. 1A has adjust the first pipe 101 and the second pipe 102.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A shower head for providing shower water, the shower head consisting of:

a main pipe, the main pipe for coupling to a water source;

a connector pipe, the connector pipe being coupled to the main pipe by a main valve, wherein the main valve being a swivel valve, wherein the main valve being able to be swiveled between zero degrees and ninety degrees (0°-90), wherein the connector pipe having a U shape;

a first pipe, the first pipe being coupled to the connector pipe by a first valve, wherein the first pipe being flexible, wherein the first valve being a swivel valve, wherein the first valve being able to be swiveled between zero degrees and ninety degrees (0°-90°), wherein the first pipe being made of a rubber material, wherein the first pipe being wrapped by a stainless-steel material, wherein the first pipe having a length of eighteen (18) inches;

a second pipe, the second pipe being coupled to the connector pipe by a second valve, wherein the second pipe being flexible, wherein the second valve being a swivel valve, wherein the second valve being able to be swiveled between zero degrees and ninety degrees (0°-90°), wherein the second pipe being made of a rubber material, wherein the second pipe being wrapped by a stainless-steel material, wherein the second pipe having a length of eighteen (18) inches; and a plurality of nozzles, the plurality of nozzles being coupled to the first pipe and the second pipe, wherein the number of the plurality of nozzles being ten (10) coupled to the first pipe and the second pipe in total, and wherein the nozzles being adjustable.

* * * * *